Sept. 2, 1924.

J. H. HASTE ET AL 1,507,174

PHOTOGRAPHIC FILM WITH BASE OF NEUTRAL TINT

Filed Oct. 14, 1922

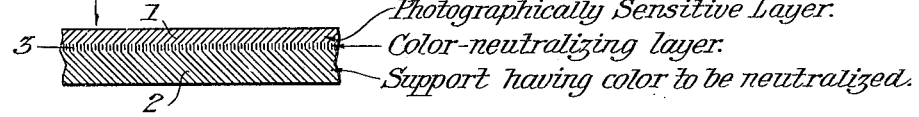

FIG-1-
- Photographically Sensitive Layer.
- Color-neutralizing layer.
- Support having color to be neutralized.

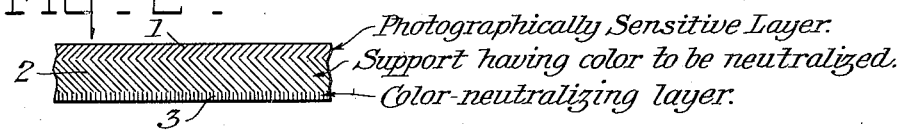

FIG-2-
- Photographically Sensitive Layer.
- Support having color to be neutralized.
- Color-neutralizing layer.

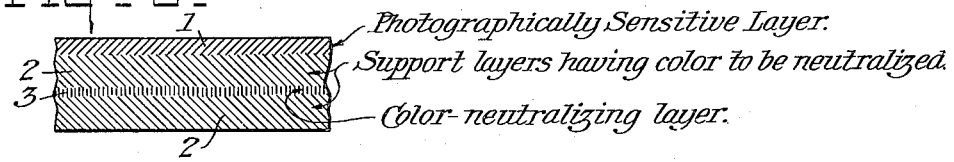

FIG-3-
- Photographically Sensitive Layer.
- Support layers having color to be neutralized.
- Color-neutralizing layer.

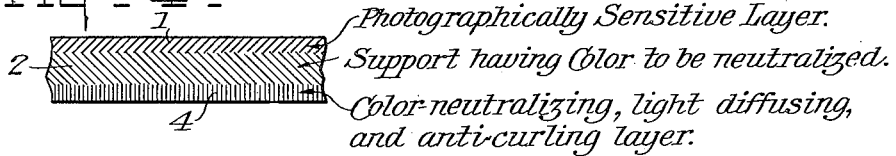

FIG-4-
- Photographically Sensitive Layer.
- Support having Color to be neutralized.
- Color-neutralizing, light diffusing, and anti-curling layer.

INVENTORS,
James H. Haste & Erwin J. Ward,
BY
ATTORNEY

Patented Sept. 2, 1924.

1,507,174

UNITED STATES PATENT OFFICE.

JAMES H. HASTE AND ERWIN J. WARD, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC FILM WITH BASE OF NEUTRAL TINT

Application filed October 14, 1922. Serial No. 594,562.

*To all whom it may concern:*

Be it known that we, JAMES H. HASTE and ERWIN J. WARD, citizens of the United States of America, residing at Rochester, in the county of Monroe and State of New York, have invented certain new and useful Improvements in Photographic Films with Base of Neutral Tint, of which the following is a full, clear, and exact specification.

This invention relates to photographic films, the supporting layers of which are of cellulosic material. It more particularly relates to those kinds of such films that are customarily viewed by transmitted light after images are formed thereon. The principal object of the invention is to neutralize color in the bases or supporting layers of such films. Other objects will hereinafter appear.

In the accompanying drawing, Figs. 1, 2, 3, and 4 are diagrammatic sectional views of four different films embodying our invention, the scale being exaggerated for the sake of clearness. Where the layers of the films blend into each other by a sort of weld, continuous outlines are omitted.

In the case of films which have cellulosic supports or bases, the latter sometimes have a color which is objectionable when an image, formed on such film, is viewed by transmitted light. For instance, a yellowish color may be undesirable when viewing certain kinds of X-ray films by means of white light. We have discovered that this objection can be avoided by employing an auxiliary layer having a color of a kind and intensity that will neutralize the objectionable tint or color of the base or support.

In Fig. 1, which shows the preferred form of our invention, a photographically sensitive layer 1 is carried by a flexible light-transmitting cellulosic support or base 2. The latter may be composed of any known composition of nitrocellulose, cellulose acetate or cellulose ether which has an objectionable color, such as yellow or brown. Between the support 2 and the sensitive layer 1 is an intermediate uniting layer or substratum 3. In this we incorporate enough dye of a color complementary to the color of the support 2 to neutralize it. This substratum may be of the type described in U. S. Patent No. 550,288, Penniman, Nov. 26, 1895. By referring to the colors as complementary, we wish to indicate only that they are sufficiently separated in the spectrum to give an effective or practical neutralization of each other. In other words, when the finished film is examined by transmitted white light the base will appear substantially neutral or colorless to an ordinary observer.

By applying the color in a layer upon an already formed support, instead of incorporating it in the liquid composition from which the support is formed, we are enabled to premeasure very accurately the depth of color in the support and then use just the right amount of a correctly colored dye in the auxiliary neutralizing layer. Most of the usual types of dyes may be employed. For neutralizing the yellowish tint of certain kinds of nitrocellulose supports we have found suitable a solution of 1 part of the condensation product between tetramethyl diaminobenzyl phenone and phenyl alpha naphthyl amine, generally known as Victoria blue B and .6 parts of the condensation product of aniline or orthotoluidine with the indamine prepared by the oxidation of a mixture of equally molecular proportions of orthotoluidine and 2.5 toluylenediamine, generally known as safranine in methyl alcohol.

In Fig. 2 we have shown a modification in which the layer 3 containing the neutralizing color is placed upon the back of support 2,—that is, upon the side opposite to the sensitive layer 1. If the base contains a plurality of supporting layers 2, as shown in Fig. 3, we may place the neutralizing color in a uniting layer 3 between them, the sensitive layer 1 being then placed upon an outer surface. In Fig. 4 we have shown a still further modification in which the sensitive layer 1 is on the opposite side of the base 2 from the layer 4 which is not only of the customary "non-curling" type but also contains light-diffusing substances and sufficient neutralizing color. This is particularly advantageous in X-ray work. If, for example, layer 4 be composed of gelatine with one per cent of calcium or barium sulfate distributed in it together with sufficient blue dye to neutralize the yellow of support 2, the finished X-ray shadowgraph or image in layer 1 can be viewed to better effect because the light transmitted through the layers 4 and 2 to the image and thence to the eye of the observer will be diffused in the layer 4 and the combined color or tint will be neutral or effectively white. The dye in this instance, as in the other forms of the invention, is one that is not washed out or impaired by the ordinary photographic developing and fixing baths.

Having thus described our invention, what we claim as new and desire to secure by Letters Patent is:

1. As an article of manufacture a photographic film comprising a photographically sensitive layer, a light-transmitting support therefor having a color which would be displeasing when viewing an image formed from said sensitive layer, and a layer containing sufficient complementary color to substantially neutralize said first named color.

2. As an article of manufacture a photographic film comprising a photographically sensitive layer, a light-transmitting flexible cellulosic support therefor having a yellowish color and a layer containing sufficient bluish color to substantially neutralize said yellowish color.

3. As an article of manufacture a photographic film comprising a gelatino-silver-halid layer sensitive to X-rays, a light-transmitting nitrocellulose support therefor having a weak yellowish color, and a layer between said first named layer and said support having sufficient bluish color to substantially neutralize said yellowish color.

Signed at Rochester, New York, this 11th day of October, 1922.

JAMES H. HASTE.
ERWIN J. WARD.